United States Patent [19]
Brodsky

[11] Patent Number: 4,907,153
[45] Date of Patent: Mar. 6, 1990

[54] AUTOMOBILE SEAT POSITION CONTROL SYSTEM

[76] Inventor: Stephen L. Brodsky, 4572 Vista Del Valle, Moorpark, Calif. 93021

[21] Appl. No.: 88,817

[22] Filed: Aug. 24, 1987

[51] Int. Cl.[4] .............................................. G06F 15/20
[52] U.S. Cl. ........................... 364/424.05; 364/424.01; 318/466; 318/467; 296/65.1
[58] Field of Search ..................... 364/424.05, 424.01; 296/65 R, 65.1; 318/466, 467, 603

[56] References Cited

U.S. PATENT DOCUMENTS

| | | | |
|---|---|---|---|
| 4,204,255 | 5/1980 | Cremer | 296/65 R |
| 4,401,928 | 8/1983 | Kamijo et al. | 318/466 |
| 4,404,632 | 9/1983 | Harada et al. | 296/65 R |
| 4,434,468 | 2/1984 | Caddick et al. | 318/466 |
| 4,470,108 | 9/1984 | Kato et al. | 318/603 |
| 4,528,491 | 7/1985 | Takeuchi et al. | 318/603 |

FOREIGN PATENT DOCUMENTS

| | | | |
|---|---|---|---|
| 2317824 | 10/1973 | Fed. Rep. of Germany | 296/65 R |
| 0175437 | 10/1982 | Japan | 296/65 R |
| 0191837 | 9/1985 | Japan | 296/65 R |

*Primary Examiner*—Parshotam S. Lall
*Assistant Examiner*—V. Trans
*Attorney, Agent, or Firm*—Donald A. Streck

[57] ABSTRACT

In an automobile seat mounted for movement by an electric motor connected between a battery and ground, an improved control system for the motor. There is a power transistor connected in series with the motor. Digital logic is connected for controlling the power transistor. A switch is operably connected for inputting direction control requests for the motor to the digital logic means. Finally, there is a tachometer driven by the motor and having an output connected to the digital logic means for indicating when the motor is moving. The digital logic includes logic for applying a series of pulses of increasing duration to the power transistor when starting the motor to affect a pseudo up ramp power input to the motor and logic for applying a series of pulses of decreasing duration to the power transistor when stopping the motor to affect a pseudo down ramp power input to the motor. There is logic for turning off the power transistor if movement of the motor has not occurred by a pre-established time following the application of power to the motor and logic for turning off the power transistor if the motor stops at any time during the application of power to the motor. Provision is made to prevent motor movement during lockup and to prevent the motor from going to the ends of its motion after the first time that the end point has been reached. There is also provision in the preferred embodiment for tilting an automobile seat controlled by the motor to compensate for road banking and centrifugal forces on the driver.

3 Claims, 4 Drawing Sheets

AUTOMOBILE SEAT POSITION CONTROL SYSTEM

BACKGROUND OF THE INVENTION:

The present invention relates to automobile seat adjustment systems and, more particularly, in an automobile seat mounted for movement by an electric motor connected between a battery and ground, to the improved control system for the motor comprising, a power transistor connected in series with the motor; digital logic means connected for controlling the power transistor; switch means operably connected for inputting direction control requests for the motor to the digital logic means; and, tachometer means driven by the motor and having an output connected to the digital logic means for indicating when the motor is moving.

Early automobile seats were fixed as to their position and the driver adapted his posture for the seat. Later, the seats were improved by mounting them on spring-biased tracks so that the seat could be slid forward and backward to provide some adaptability for different sized drivers. A later innovation was the providing of various reclining positions to the seat back, again under mechanical control. Subsequently, some manufacturers added mechanical lumbar support adjustability.

In parallel to the above-described improvements to automobile seat positional adjustability, the accomplishment of such features through switch-operated electrical or hydraulic actuators was introduced in higher-priced automobiles. By closing a switch, a particular aspect of the seat position could be adjusted. Typically, each feature had a bi-directional switch for moving the seat's position in opposite directions. For example, one switch was used for moving the seat forward and backward, one switch for raising and lowering the seat, etc. If drivers changed, the entire seat positioning sequence had to be repeated; that is, each new driver had to maneuver the various buttons and/or mechanical levers to try to reposition the seat as most comfortable for him or her. Repeatability was a catch as catch can accomplishment as no memory was provided.

A very recent introduction in the field of automobile seat positional control systems is the introduction of position with memory associated with a plurality of drivers. In some high-priced automobiles, each driver can set his or her desired seat positions and have them automatically repositioned upon entry to the automobile and commanding the seat control system to do so.

One aspect of seat adjustability that is of recent introduction is the inclusion of pneumatic bladders within the seat structure to change the seat contours in addition to the prior positional adjustability through the use of motors. Thus, by inflating or deflating bladders, a driver can change the amount of support provided in the lumbar area, lateral rib support, thigh lateral support, and thigh vertical support, etc. Unfortunately, the prior art has yet to accomplish a usable bladder system with a memory associated therewith. Thus, the recent high-priced automobile seat systems with driver memory do not include those aspect of seat conformation customization which require bladders.

Additionally, the prior art in seat control systems is large, cumbersome, overburdened with controls, and, in general, lacks adequate safety provisions to protect the driving mechanisms and even the passengers from damage in the event of component failure.

Wherefore, it is the object of the present invention to provide a digital control system for controlling all aspects of an automobile seat's conformation and positioning in a manner which is simple, inexpensive, safe for occupants and components, and which provides full driver memory reconfiguration.

Additional objects of the present invention will become apparent from the description contained hereinafter taken in conjunction with the drawing figures which accompany it.

SUMMARY:

The foregoing object has been achieved in an automobile seat mounted for movement by an electric motor connected between a battery and ground by the improved control system for the motor of the present invention comprising, a power transistor connected in series with the motor; digital logic means connected for controlling the power transistor; switch means operably connected for inputting direction control requests for the motor to the digital logic means; and, tachometer means driven by the motor and having an output connected to the digital logic means for indicating when the motor is moving.

In the preferred embodiment, the digital logic means includes logic for applying a series of pulses of increasing duration to the power transistor when starting the motor to affect a pseudo up ramp power input to the motor and the digital logic means includes logic for applying a series of pulses of decreasing duration to the power transistor when stopping the motor to affect a pseudo down ramp power input to the motor.

Additionally in the preferred embodiment, the digital logic means includes logic for turning off the power transistor if movement of the motor as indicated by the output from the tachometer means has not occurred by a preestablished time following the application of the series of pulses affecting the pseudo up ramp power input to the motor and logic for turning off the power transistor if movement of the motor as indicated by the output from the tachometer means stops at any time during the application of power to the motor.

The preferred embodiment additionally comprises, means connected to the digital logic means for maintaining a present count of the pulses; means connected to the digital logic means for maintaining a count of the pulses at the highest count reached in one direction of movement of the motor; wherein, the digital logic means includes logic for turning off the power to the motor when the present count equals the highest count. The digital logic means also includes logic for setting the highest count to the present count when the output from the tachometer means indicates the motor has stopped moving with power applied to it.

As an additional feature of the preferred embodiment, there are means operably connected for tilting the seat to its sides driven by the motor; sensor means carried by the seat and operably connected to the digital logic means for indicating when the seat is tilted to the side and for indicating when the seat is being subjected to a lateral centrifugal force; and the digital logic means includes logic for tilting the seat towards a vertical orientation with respect to gravity when the sensor means indicates that the seat is tilted from road banking in the absence of a centrifugal force and for tilting the seat into a centrifugal force.

Figure 1:
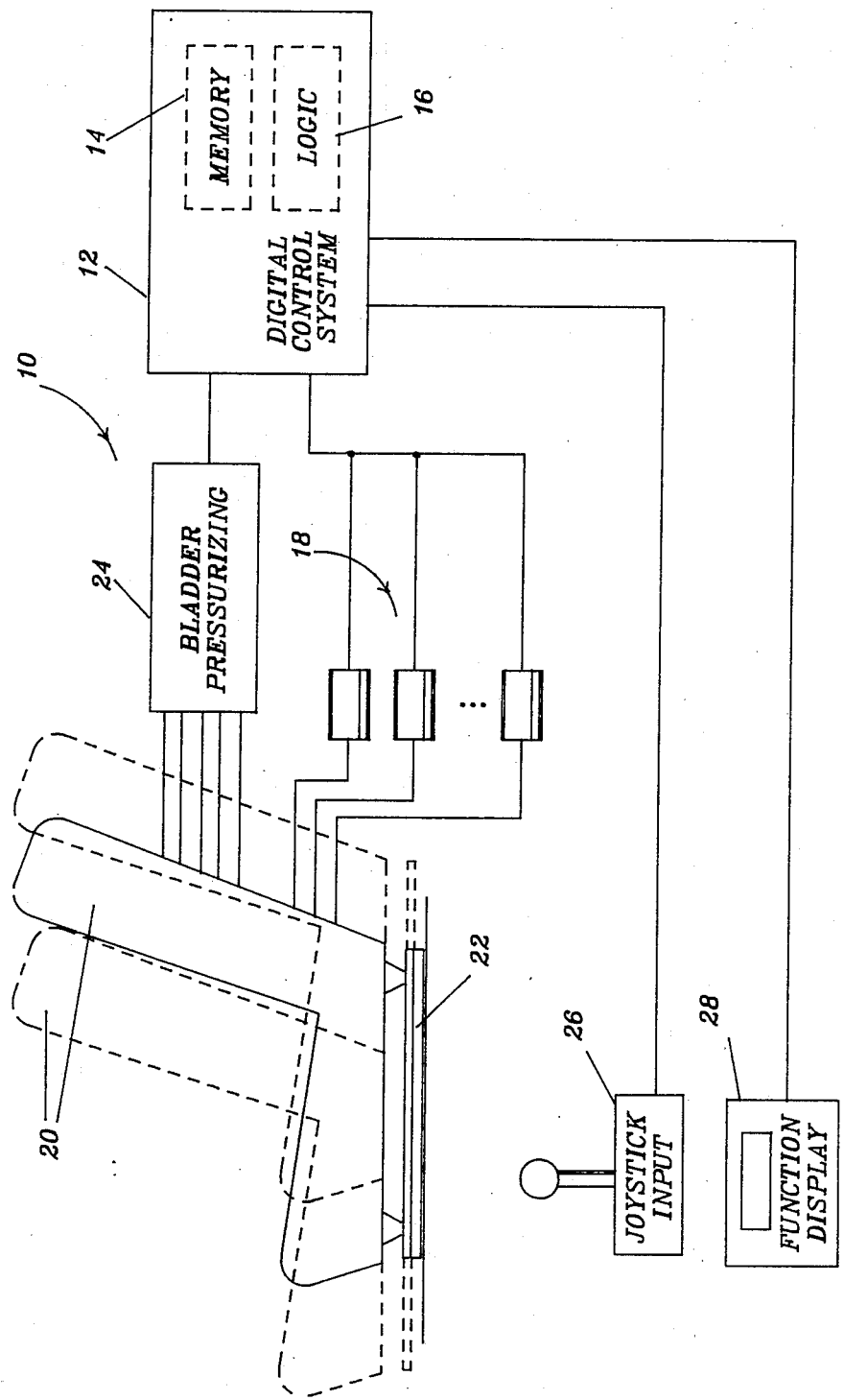
FIG. 1 is a general block diagram of an automobile seat control system according to the present invention.

DESCRIPTION OF THE PREFERRED EMBODIMENT:

An automobile seat control system according to the present invention is generally indicated as 10 in FIG. 1. Control system 10 employs a digital control system 12 incorporating digital memory 14 and digital programming logic 16. According to techniques well known in the art, the programming logic 16 is preferably contained in readonly memory (ROM) while memory 14 can both be written into and read from, i.e. random access memory (RAM). A plurality of motors 18 are employed to affect positional changes in the seat 20 such as fore and aft movement on tracks 22, as indicated by the ghosted positions in the figure. The motors 18 are individually assigned to different seat positioning functions such as up/down, fore/aft, recline, and tilt. Additionally, there is a bladder pressurizing system 24 which is controlled by the digital control system 12 and used to pressurize and depressurize bladders (not shown) contained within the seat 20 to affect contour reconfiguration of the seat 20. The bladder pressurizing system 24 is according to a unique construction as described in detail in my co-pending application Ser. No. 062,240, filed June 15, 1987, and entitled INFLATABLE BLADDER SYSTEM WITH MEMORY. Reference should be made to that co-pending application for a detailed description of the manner of operation of the bladder pressurizing system 24. Bladder pressurizing system 24 will not be described in greater detail hereinafter in the interest of simplicity and the avoidance of redundancy.

Control of all the functions of seat position and reconfiguration in the present invention is accomplished by a single joystick-type input device 26 in conjunction with a functional display 28. As with the above-mentioned bladder pressuring system, the preferred joystick input device 26 and associated functional display 28 are part of a novel apparatus described in detail in my co-pending application Ser. No. 062,553, filed June 15, 1987, and entitled MULTIFUNCTION INPUT DEVICE AND SYSTEM. Again, reference should be made to that co-pending application for a detailed description of the input device and its manner of operation and no further description thereof will be contained hereinafter.

Figure 2:
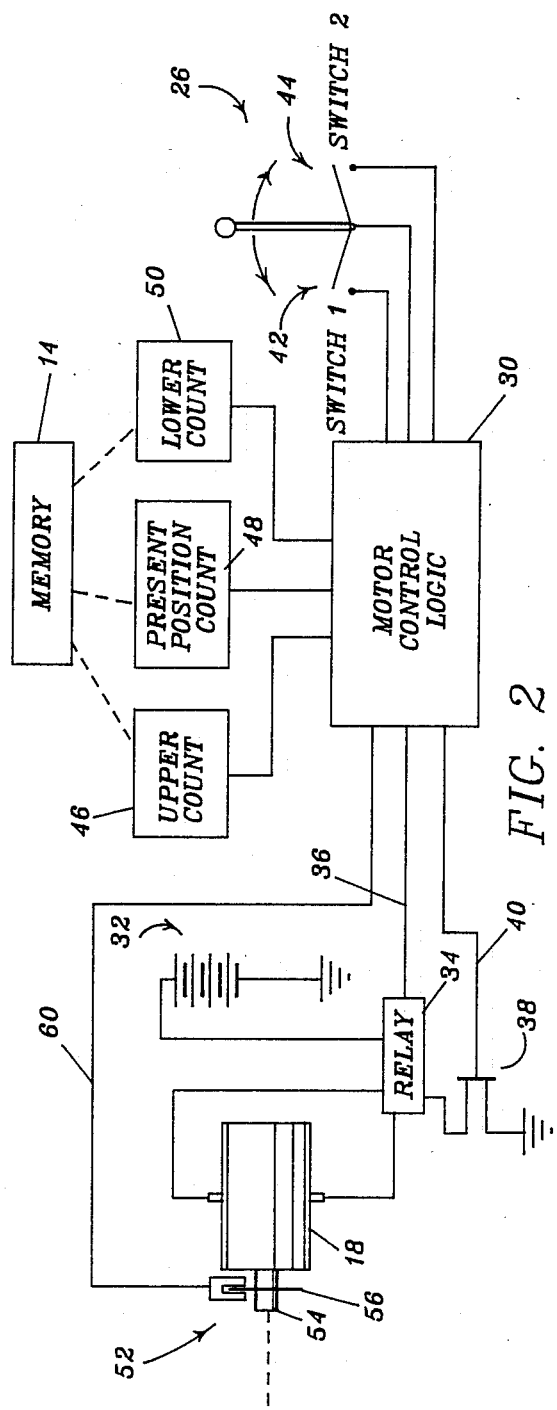
FIG. 2 is a block diagram showing the manner in which the present invention controls the electric motors employed therein.
Figure 3:
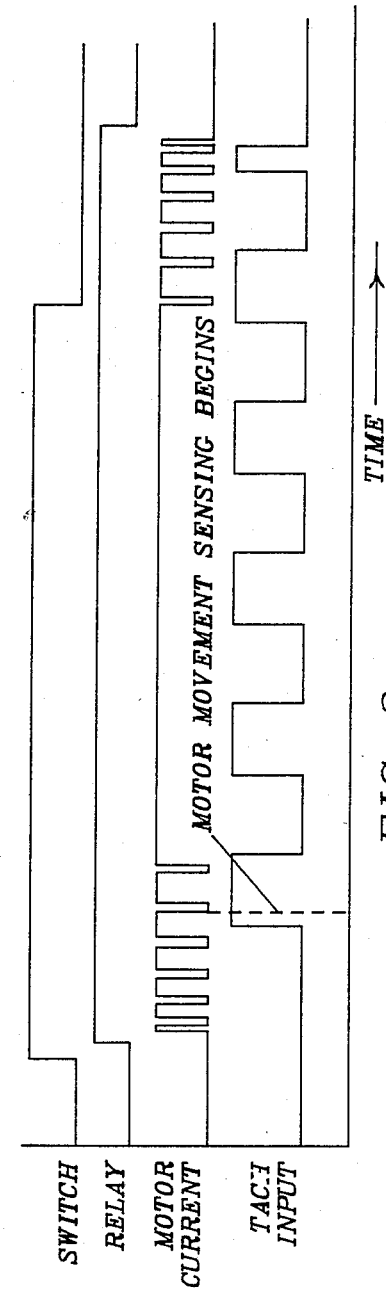
FIG. 3 is a timing diagram showing how the motor control logic of FIG. 2 operates.

Turning now to FIGS. 2 and 3, a single motor 18 and its manner of control according to the present invention will now be described in detail. Motor 18 is controlled by motor control logic 30 contained within the digital control system 12. One terminal of the motor 18 is connected to battery 32 through a power relay 34 controlled by the motor control logic 30 by means of control input line 36. The other terminal of the motor 18 is connected to the other side of the battery 32 via the chasis ground through a power transistor 38. Transistor 38 is of a type generally available and well known to those skilled in the art and the current therethrough (and therefore the current through the motor 18) is controlled by the motor control logic 30 via line 40 in a manner well known to those skilled in the art. For control of the motor 18 by the human operator (i.e., the driver), joystick input device 26 includes a first switch 42 and a second switch 44 connected to the motor control logic 30 for indicating a desire for the motor 18 to be turned in one direction or the other to affect a corresponding positional change in the seat 20 in one of two opposite directions. Motor control logic 30 is also connected to three digital registers 46, 48, and 50 utilized for maintaining an upper count, a present position count, and a lower count, respectively. The registers 46, 48, 50 can be physical hardware registers or merely memory positions within memory 14 as desired. If hardware registers are employed, the contents of the registers 46, 48, 50 associated with each motor 18 must be loaded from the memory 14 as each motor 18 is being controlled by the joystick input device 26. If software registers are employed, the proper memory locations within memory 14 for the particular motor 18 being controlled must be addressed by appropriate pointers within the software logic prior to controlling the motor 18 with motor control logic 30.

The final input to the motor control logic 30 from each motor 18 is provided by a tachometer 52. To provide the tachometer function in simplified form within the present invention, the output shaft 54 of motor 18 has a disc 56 mounted thereon which rotates with the output shaft 54. Disc 56 is divided into transparent and opaque segments and the disc 56 is positioned within an optical transducer 58 of a type well known in the art wherein a light emitting diode is disposed on one side and a light sensing diode is disposed on the opposite side of the disc 56. Thus, as output shaft 54 and disc 56 rotate, the light path within the transducer 58 is opened and blocked causing a square wave output pattern on line 60, which is connected as an input to the motor control logic 30. The manner in which the motor control logic 30 operates to affect the objects of the present invention will now be described in detail.

The manner of operation of motor control logic 30 can best be understood with reference to the wave form versus time graph of FIG. 3. The first occurrence is the closing of one of the switches 42, 44 indicating the driver's desire to have motor 18 move in one direction or the other. Shortly after the motor control logic 30 senses the closing of the switch, it causes the relay 34 to close, thus connecting the motor 18 to the battery 32. Following the close of relay 34, the transistor 38 is pulsed with a rapid and increasing duration square wave pattern as depicted in FIG. 3, which results in an effective ramping up of the motor current to smoothly accelerate the motor 18 against the gear drive (not shown) within the seat structure being driven thereby. The pseudo-ramp affected by the increasing duration pulse pattern employed within the present invention eliminates the stresses imparted to the motor 18 and attendant drive components in the prior art approach of simply employing a relay such as relay 34 for complete on/off control of the motors in the system. In the present invention, the motor 18 is smoothly ramped up to full and constant current in approximately one-eighth of a second. At a point in time within the one-eighth of a second wherein motor movement should have begun with attendant output on line 60 from the optical transducer 58, the motor control logic 38 begins watching the tach input on line 60 for the square wave pattern as mentioned above, indicating motor movement. If the motor 18 fails to move for any reason (indicating movement blockage, broken wire, failed motor, or what have you), the motor control logic 30 instantly switches to the ramp down pattern shown on the right side of FIG. 3 and terminates the request for movement of motor 18 despite the switch 42, 44 being maintained in its closed position by the driver. If motor movement is sensed, constant motor current is applied as shown in the central portion of FIG. 3 until the driver releases the switch 42, 44. Upon switch release being sensed, a decreasing width pulse pattern is applied to the motor 18 through transistor 38 to effect a pseudo-ramp down to zero speed for the same reasons and for the same benefits as the ramp up previously described. Once the motor has ceased turning, the relay 34 is once again opened to disconnect the battery 32 from the motor 18.

The motor control logic 30 is adapted to use the registers 46, 48, 50 to prevent motor stall, monitor for non-movement of the motor 18, and to find and remember the end points of movement such that the motor 18 is never required to go into stall mode at the ends of movement after the first time the ends have been reached. With the present invention, the end points are anticipated and deceleration prior thereto is affected within 0.02 inches. The resulting benefits to life expectancy and lack of damage to the motor 18 and associated components through the avoidance of end points should be obvious. The particular logic employed will be discussed in greater detail shortly. For the moment, however, it should be noted that upon initialization, the present count is set to zero. In a test system of the present invention as built by applicant herein, each motor 18 has a potential for counting up 33,000 counts and down 33,000 counts as numerical extremes of physical movement. As the motor 18 is moved up and down from the initial zero position, the present position count within register 48 tracks therewith. Whether a hardware or software register is employed, the present position count is stored within the memory 14 for each driver and his selected positions. As movement is affected, the present position count in register 48 is compared to the upper count in register 46 and the lower count in register 50, depending upon which direction the motor 18 is being moved. The first time the motor 18 is driven to one extreme or the other, the present position count 48 is stored and locked into the associated directional register 46, 50. Thus, the first time the end point is reached, that value is stored and by anticipatory comparison of the present position to the limit count, the end point can be anticipated and avoided by prior deceleration of the motor 18. The same approach also accounts for stall prevention, non-movement, lockout, and the like. Any time that the motor control logic 30 is applying current to the motor 18 (after the initial ramp up period), the tach input is continually sensed for motor movement. If motor movement ceases for any reason, be it reaching the end of the limit of travel, motor failure, a foot in the path of movement, the result is the same, the present position count is inserted permanently into the appropriate register 46, 50 and no further movement in that direction can be affected. In the case of a broken wire, frozen motor, or the like, causing non-movement in either direction, the upper count and lower count in registers 46, 50 will be identical and no further movement of the motor 18 will be undertaken in either direction regardless of the opening and closing of the switches 42, 44. To prevent bypassing by simply opening and closing the switches 42, 44, in the present invention the only and preferred way that reset can be affected is by disconnecting power to the motor control logic 30 to cause reinitialization thereof. While other reset techniques could, of course, be applied, in the present invention and its environment of use, the extreme of requiring power disconnection is preferred to prevent any inadvertent damage to person or property through misuse of the equipment.

Figure 4:
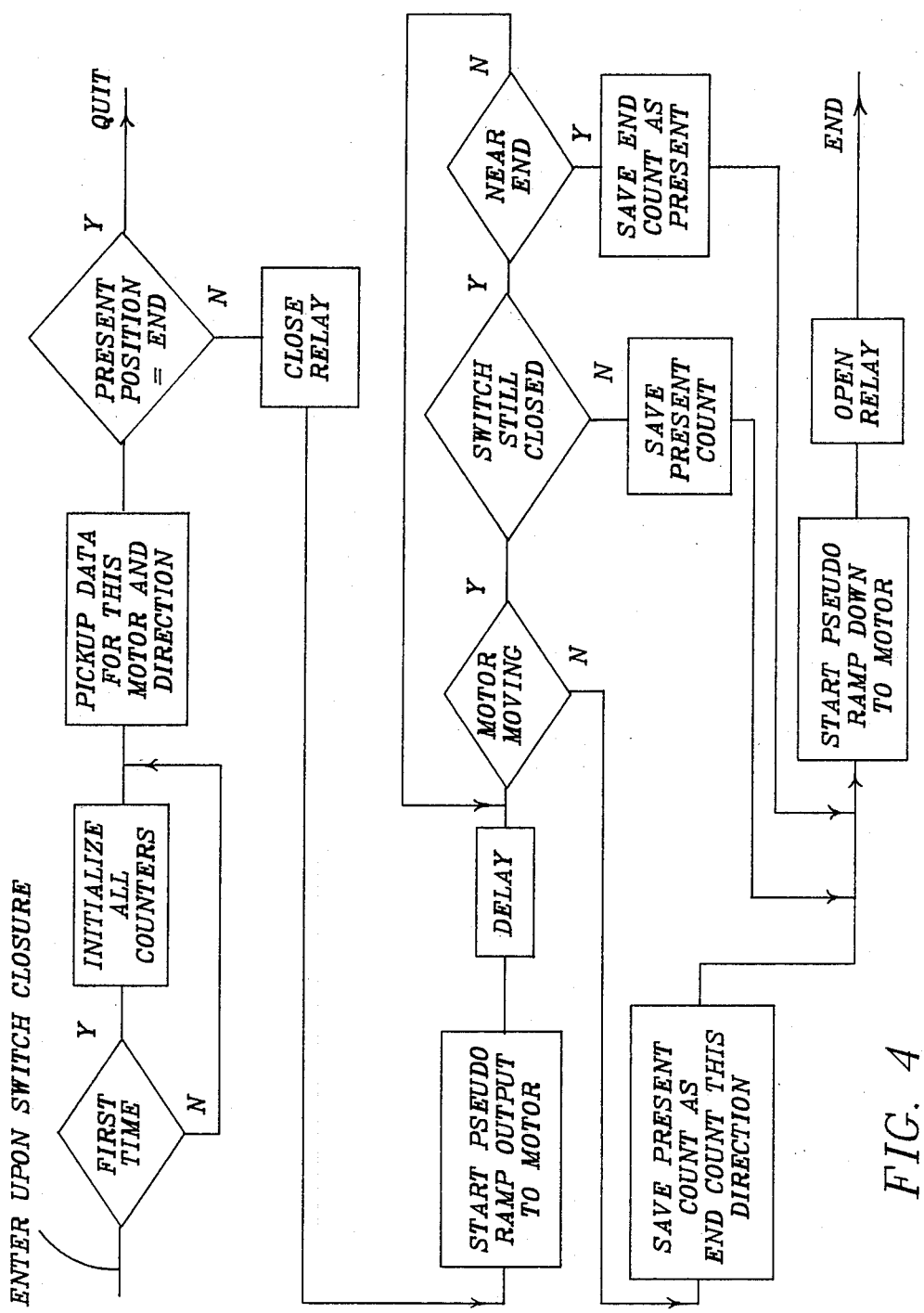
FIG. 4 is a logic diagram of the motor control logic of FIG. 2.

The general logic contained with motor control logic 30 is shown in FIG. 4. Upon closure of a switch requiring motor movement, the logic first checks to see if this is the first time through the logic following power up and, if it is, all the counters are initialized. This is the portion discussed above wherein reset following lockup for any reason can only be affected in the preferred embodiment by removing and restoring power. The logic next picks up the data for this motor and the required direction from the memory 14 (or sets its pointers to access the proper memory location). The first thing the logic then does is to check to see if the present position count is equal to the end position count in this direction, i.e., if the motor is at its end position physically or as the result of a failure. If it is, the logic quits and goes no further. If there is room for movement, the relay 34 is closed and the logic starts the pseudo-ramp discussed above to smoothly accelerate the motor. After a short delay as mentioned above to allow the motor time to begin moving, the logic next checks the output from the tachometer 52 on line 60 to see if the motor is moving. If it is not, the present count is saved as the end count for this direction, the pseudoramp down is affected, and finally the relay is opened. That is the lockup sequence mentioned above.

Figure 5:
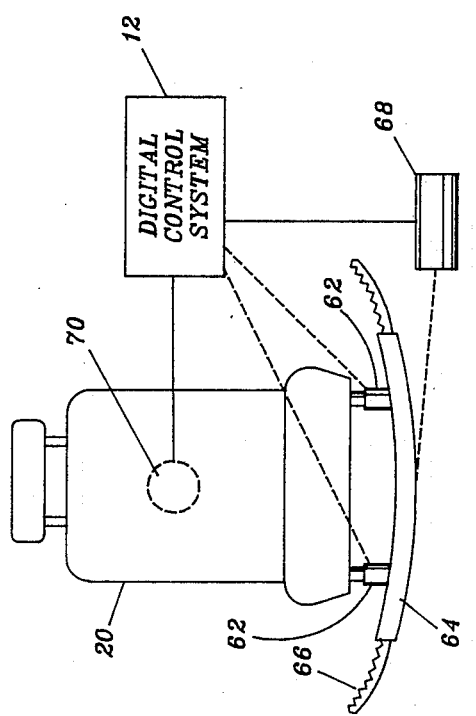
FIG. 5 is a front simplified view of an automobile seat according to the present invention including provision for tilting the seat to compensate for lack of sufficient road banking.
Figure 6:
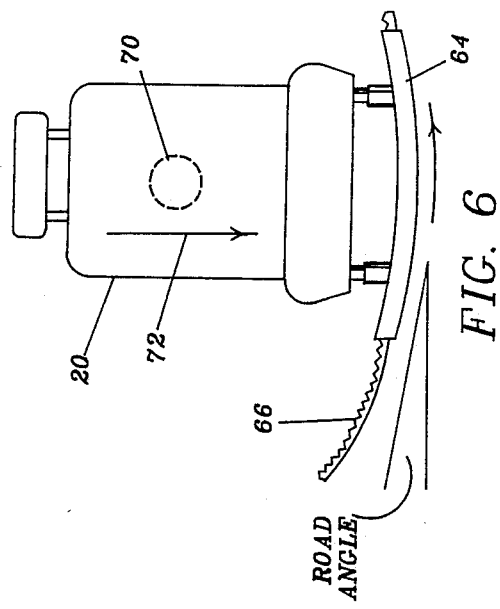
FIG. 6 shows the seat of FIG. 5 tilted by moving it laterally on a curved track.
Figure 7:
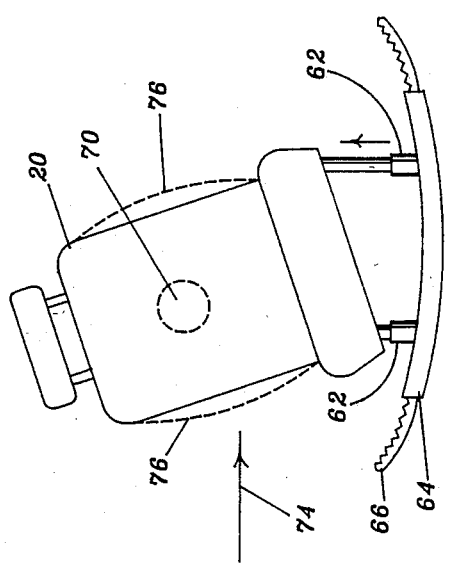
FIG. 7 shows the seat of FIG. 5 tilted by raising one side on adjustable lifts.

Another aspect of the present invention is shown in FIGS. 5-7 and has to do with dynamic adjustment of seat position to compensate for road banking and centrifugal force during turns. Modern automobile suspension systems (particularly in what could be broadly referred to as "performance" automobiles) are designed to maintain the automobile in a relatively flat orientation with respect to the road surface. Thus, where the road is banked as for rain drainage and the like, the driver must adjust his position in the seat in an attempt to achieve a vertical orientation. Likewise, in any kind of a turning situation where there is insufficient banking of the road, he must also adjust position to compensate for the centrifugal forces being applied to his body. The back is arched and the muscles of the back and legs tensed against the applicable seat portions in an attempt to maintain control and position. Both situations can be exhausting and, in some cases, physically debilitating, particularly on long trips. The aspects of the present invention depicted in FIGS. 5-7 eliminate these problems.

As shown in FIG. 5, the seat is supported on the four corners of the bottom on vertically adjustable supports 62. Supports 62 are essentially small jacks and can be either of the motor-driven screw type or hydraulic, as desired. The supports 62 are operably connected to the digital control system 12 to be raised and lowered thereby in the manner to be described shortly. The supports 62, in turn, are supported on a pair of lateral curved upper tracks 64 which can be moved from side to side on the curved, toothed, lower tracks 66 by motor 68 under the control of the digital control system 12.

An inclineometer/accelerometer sensor 70 is mounted within the back of the seat 20 to provide appropriate input information to the digital control system 12. In use, the system operates in its preferred manner as depicted in FIGS. 6 and 7. As the sensor 70 detects a bank in the road tending to cause the driver to lean sideways, the digital control system 12 causes motor 68 to move the upper track 64 along the lower track 66 to tilt the seat 20 back into a vertical orientation with gravity urging the driver down onto the the seat bottom as indicated by the arrow 72. As illustrated in FIG. 6. It should be noted that the drawing figures are exaggerated with respect to the amount and distance of movement for purposes of illustration only. As will be appreciated, the amount of lateral shifting and tipping possible with the tracks 64, 66 in the limited space available is fairly small. Typically, however, the road banking being compensated for is only a few degrees and, therefore, the movement possible is adequate.

Compensation for centrifugal forces during turns as indicated by the arrow 74 is illustrated in FIG. 7. To achieve the degree of tipping required to compensate for the lateral force 72, the outer supports 62 are raised to tip the seat 20 into the force 72. In the preferred embodiment, the bladder pressurizing system 24 is also employed by the digital control system 12 to increase pressure in the bladders in the areas indicated by the dashed lines 76 to give additional support for the upper areas of the driver's body so as to resist the lateral force 72 without the driver having to tense his muscles to do so until the supports 62 can respond. As a result, the driver can pay full attention to driving the automobile and need not concern himself with changing body position. As those skilled in the art will readily recognize, the tilting of the seat 20 to compensate for road banking and the tilting of the seat 20 to compensate for centrifugal force are in opposite directions. Thus, the compensation for centrifugal force must supercede the compensation for road banking within the logic 16 of the digital control system 12.

Wherefore, having thus described my invention, I claim:

1. In an automobile seat mounted for movement by a DC electric motor connected between a battery and ground, the improved control system for the motor comprising:
    (a) a power transistor electrically connected in series with the motor's connection between the battery and ground so as to control the operation of the motor;
    (b) digital logic means connected to said power transistor for controlling the amount of current said power transistor allows to flow from the battery through the motor to ground;
    (c) switch means operably connected to said digital logic means for inputting direction control requests for the motor from a user to said digital logic means;
    (d) movement detection means driven by the motor and having an output connected to said digital logic means for indicating when the motor is moving, said movement detection means comprising,
        (d1) a disc mounted on an output shaft of the motor to rotate in combination therewith, said disc being divided into alternating transparent and opaque segments, and
        (d2) an optical transducer having a slot with said disc disposed therein, said transducer having a light emitting diode disposed on one side of said slot and said disc disposed therein and a light sensing diode disposed on the opposite side of said slot and said disc disposed therein whereby as said disc rotates with the motor said disc within said transducer between said light emitting and light sensing diodes is opened and blocked causing an output comprising a series of square wave pulses which is connected as an input to said digital logic means; and,
    (e) said digital logic means including logic for applying a series of pulses of increasing duration to said power transistor when starting the motor to affect a pseudo up ramp power input to the motor and logic for applying a series of pulses of decreasing duration to said power transistor when stopping the motor to affect a pseudo down ramp power input to the motor.

2. The control system of claim 1 wherein:
    said digital logic means includes logic for turning off said power transistor if movement of the motor as indicated by said output from said movement detection means has not occurred in a pre-determined time interval following the application said series of pulses affecting said pseudo up ramp power input to the motor and logic for applying a series of pulses of decreasing duration to said power transistor to affect a pseudo down ramp power input to the motor.

3. The control system of claim 1 additionally comprising:
    (a) means connected to said digital logic means for maintaining a present count of said pulses;
    (b) means connected to said digital logic means for maintaining a count of said pulses at a highest count reached in one direction of movement of the motor; and wherein,
    (c) said digital logic means includes logic for turning off said power transistor when said present count approaches said highest count so that the motor stops before said present count equals said highest count whereby once the motor reaches a stall state a first time it is not subjected to a stall a second time, said logic for turning off said power transistor including logic for applying a series of pulses of decreasing duration to said power transistor to affect a pseudo down ramp power input to the motor.

* * * * *